O. J. STAFFANSON.
HARNESS.
APPLICATION FILED APR. 18, 1913.
1,125,200.
Patented Jan. 19, 1915.
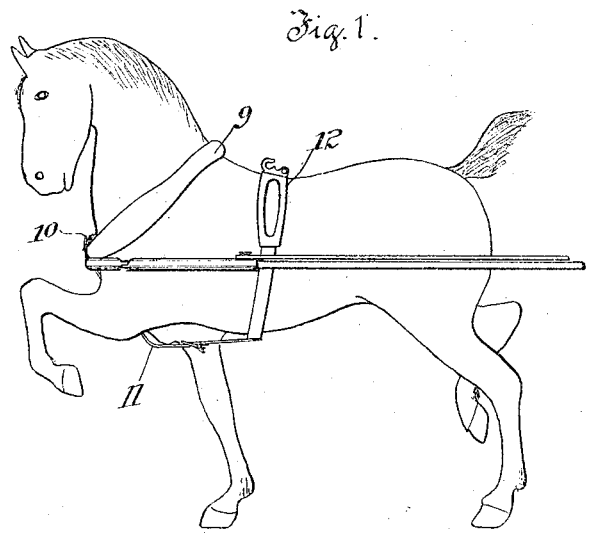
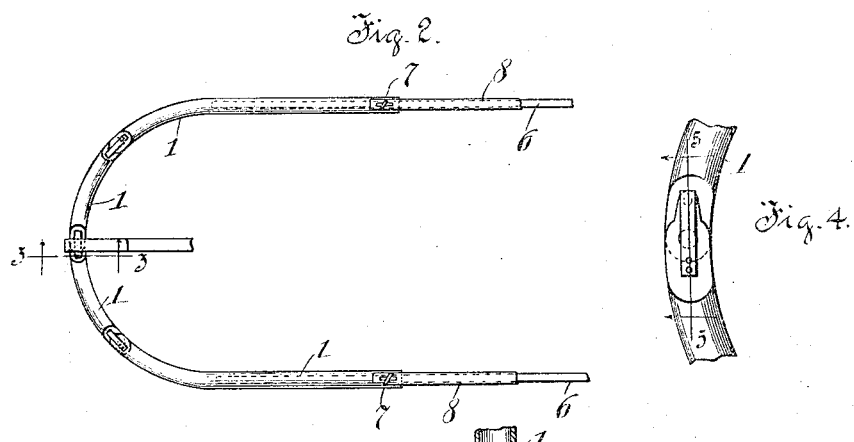
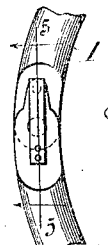
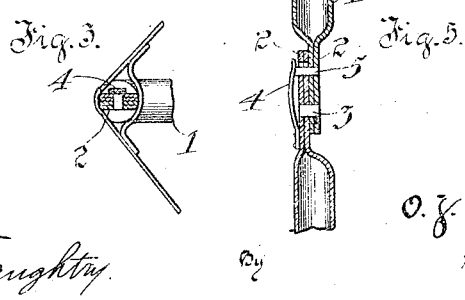

UNITED STATES PATENT OFFICE.

OLE J. STAFFANSON, OF KENSINGTON, MINNESOTA.

HARNESS.

1,125,200.  Specification of Letters Patent.  Patented Jan. 19, 1915.

Application filed April 18, 1913. Serial No. 762,066.

*To all whom it may concern:*

Be it known that I, OLE J. STAFFANSON, a citizen of the United States, residing at Kensington, in the county of Douglas and State of Minnesota, have invented certain new and useful Improvements in Harness, of which the following is a specification.

This invention relates to improvements in harness and its object is to produce a harness that is collapsible and that can be substituted for the ordinary harness in case the latter should break while in use.

Simplicity, durability and efficiency are all features of my improved harness. While it is intended primarily as an emergency harness it may be entirely substituted for the common harness if desired.

With the foregoing and other objects in view the invention consists in the combination and arrangement of parts to be hereinafter fully described in the following specification, pointed out in the claim and illustrated in the accompanying drawing which forms a part of said specification and in which—

Figure 1 is a side elevation of my improved harness in use. Fig. 2 is a plan of the same. Fig. 3 is a section taken on line 3—3 of Fig. 2. Fig. 4 is an enlarged detail. Fig. 5 is a section taken on line 5—5 of Fig. 4.

Like reference characters indicate corresponding parts throughout the several views.

My harness comprises a plurality of pipe links 1 connected together forming a brace and the meeting ends of the several links are flattened as at 2 and connected together by a pivot 3. One of the ends is provided with a spring 4 which carries a pin 5 adapted to enter apertures in the said flattened ends as shown best in Fig. 5. The free ends of the terminal links of my harness are adapted to receive the vehicle-shaft ends 6, 6 and they are further provided with screws 7, 7, which are adapted for insertion in the slotted ends of the traces 8, 8 to retain the same in engagement with said links. The harness may be secured to the horse collar 9 by a suitable strap 10 and by a strap 11 connecting said harness with the girth 12. When not in use the pins 5 may be withdrawn from the link ends and the links oscillated upon each other upon their pivots 3.

What is claimed is:—

In a harness, a brace formed of a plurality of links pivoted together and releasably secured to the shafts and traces, the meeting ends of said links being flattened and apertured, a spring carried by one of said flattened ends, and a pin carried by said spring and normally disposed in the apertured portion of said flattened ends.

In testimony that I claim the foregoing as my own I have hereto affixed my signature in the presence of two subscribing witnesses.

OLE J. STAFFANSON.

Witnesses:
OLE LINDSTROM,
FRANK BUSCHER.

Copies of this patent may be obtained for five cents each, by addressing the "Commissioner of Patents, Washington, D. C."